Oct. 13, 1931.  H. PERROT  1,827,104

BRAKE OPERATING MECHANISM

Filed Oct. 31, 1927

INVENTOR
HENRI PERROT
BY
Burton & McConkey
ATTORNEYS

Patented Oct. 13, 1931

1,827,104

UNITED STATES PATENT OFFICE

HENRI PERROT, OF PARIS, FRANCE, ASSIGNOR, BY MESNE ASSIGNMENTS, TO BENDIX AVIATION CORPORATION, OF NEW YORK, N. Y., A CORPORATION OF DELAWARE

BRAKE OPERATING MECHANISM

Application filed October 31, 1927, Serial No. 230,091, and in France November 2, 1926.

My invention relates to brake operating mechanism such as is employed on a motor vehicle including a servo device operable in conjunction therewith and control means whereby the brakes may be applied either with or without the use of the servo and with substantially the same operative movement.

An object is to provide such a device whereby power is taken from the vehicle to assist in applying the brakes with mechanism automatically responsive to come into action irrespective of the direction of travel of the vehicle, which mechanism is under the control of means operable by substantially the same movement as is used to apply the brakes independently of the servo.

Other objects, advantages and meritorious features of my improvement will more fully appear from the following description, appended claims and accompanying drawings, wherein:

Figure 1:
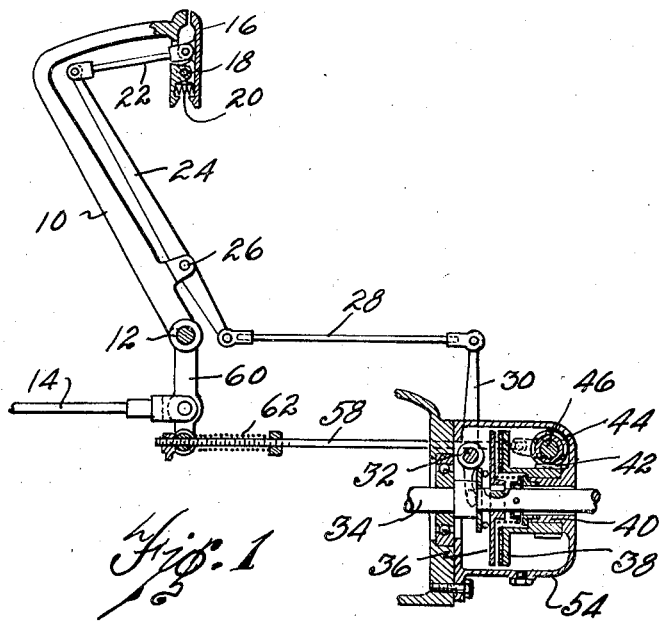
Fig. 1 is a vertical sectional view through brake operating mechanism embodying my invention.

In the drawings I show a brake pedal 10 pivotally supported at 12 and connected with a brake operating link 14. The pedal has a plate 16 pivoted at 18 and held by a spring 20 in the position shown in the figures of the drawings. A link 22 is attached to the plate at one end and at the opposite end to a lever 24 which is pivoted at 26 to the pedal 10. A link 28 is attached to the opposite end of the lever 24 and operates through a connection 30 which is pivoted at 32 in a manner hereinafter specified.

The brake pedal may be operated in the usual manner to actuate the connection 14. If the pressure is applied at the top of the plate 16, such operation will result. If the pressure of the foot of the driver is applied to the bottom of the plate 16, the plate will be swung about its pivot 18 to actuate through linkage 22, 24 and 28, the arm 30 to swing the lower forked end thereof to operate a clutch member herein described.

Figure 3:
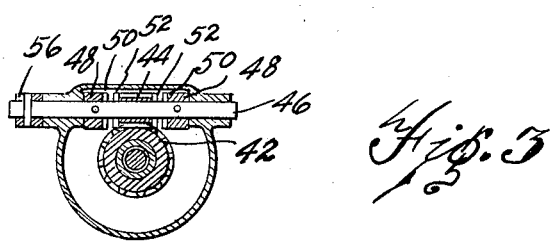
Fig. 3 is a vertical sectional view taken on line 3—3 of Fig. 1.

34 indicates a power driven shaft of the vehicle which is provided with a clutch. A clutch plate 36 is secured to the shaft to rotate therewith and a cooperative clutch plate 38 is freely journaled upon the bearing 40 which is concentric to the shaft 34. When the clutch is actuated by the member 30 the clutch plates are brought into engagement so that both plates rotate with the shaft 34. The plate 38 is provided with a hub which is geared as at 42 to drive a pinion or worm 44 that is mounted upon a shaft 46 which extends transversely to the shaft 34. This pinion 44 is slidable lengthwise of the shaft 46 as appears in Fig. 3. There is keyed to the shaft 46 upon opposite sides of the pinion 44 and spaced therefrom clutch members 48 which have clutch faces 50 adapted to engage with the clutch faces 52 upon the ends of the member 44 when such member is thrown into engagement therewith.

The worm or pinion 44 has a connection with the gear 42 through helicoidal teeth which throw the member 44 in one direction or the other upon the shaft 46 depending upon the direction of rotation of the clutch and thereby pick up the shaft 46 through the members 48 to apply a torque thereto. The shaft 46 has an arm 56 fixed thereto which connects through a link 58 with the extension 60 at the lower end of the pedal 10 and such link carries a compensating spring 62 thereby permitting independent movement of the pedal to apply the brakes through the link 14 independently of the use of the servo device. When the clutch is actuated a torque is applied to the shaft 46 which is transmitted through the link 58 to assist in applying the brakes.

Figure 2:
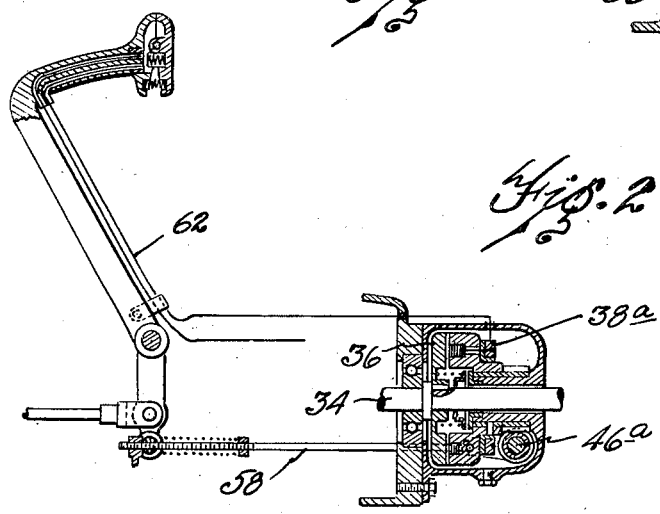
Fig. 2 is a vertical sectional view through a modified embodiment of the structure shown in Fig. 1.
Figure 4:
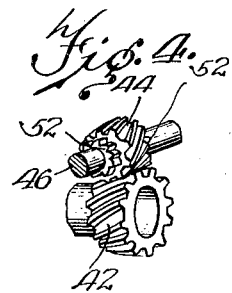
Fig. 4 is a detail of the brake power transmission mechanism.

In Fig. 2 I have shown a modified electromagnetic structure of a similar character except that an electric contact is made by depression of the movable plate on the pedal which, through the circuit 62, energizes the electromagnet 38—a to draw the plate 36 into contact therewith to produce a rotation of the driven clutch member to drive the shaft 46—a in the same manner that shaft 40 is driven to apply the brakes through the link 58 in the manner hereinabove described.

The construction in Fig. 1 embodies a brake pedal supported in the usual manner for depressible movement and having a tension connection extending to a brake, not shown, to apply the brake upon depression of the pedal. The pedal is provided with a pivotally supported tread member. If pressure is applied to one part of the tread member the pedal swings to accomplish the result above described. If pressure is applied to another part of the tread member the tread member itself swings and actuates a system of mechanical linkage which operates a clutch which accompanies a power driven shaft with the pedal to apply power to the pedal to depress it.

The power shaft may be driven in any suitable manner and is connected through the clutch to the pedal to swing the pedal. The connection between the shaft and the pedal is such as to permit independent operation of the pedal. The clutch has a driven portion provided with a gear coupling with the worm to rotate the worm upon rotation of the driven clutch. The worm is separably supported for axial movement on a shaft 46 and is caused to move over the shaft upon being picked up for rotation by the gear 42 and the driven portion of the clutch. The worm, when moved axially over the shaft, engages one of the clutch-like members on the shaft to rotate the same. These clutch members are indicated by the numeral 48. The worm moves axially over the shaft in one direction or the other depending upon the direction of rotation of gear 42 which drives the worm.

What I claim is:

1. Brake operating mechanism for a motor vehicle having a driven power shaft comprising, in combination, a brake operating connection, a manually operable control member coupled therewith to mechanically actuate the connection, a servo device including a clutch coupled with said shaft, control means for bringing said clutch into operation to be driven by the shaft and means connecting the clutch with said control member to move the same to actuate said connection.

2. Brake operating mechanism for a motor vehicle having a power driven shaft comprising a brake operating connection, a manually operable control member mechanically coupled therewith to actuate the connection, a servo device including a clutch having one part rotatable with the shaft and a driven part operable to be moved into engagement with said first part to rotate therewith, control means for bringing said clutch into operation, a member coupled with the clutch to be actuated thereby in one direction when the vehicle is traveling forwardly and in the opposite direction when the vehicle is traveling in reverse, said member connected with said control member so that in either direction of its movement it operates the control member to actuate the brake connection.

3. Brake operating mechanism, including a servo device, for a motor vehicle having a power driven shaft comprising in combination; a brake operating connection, a control member therefor, a clutch coupled with the shaft to be driven thereby, control means for the clutch, a member coupled with the clutch and responsive to its direction of rotation, to travel in one way when the clutch is rotating in one direction and in the other way when the clutch is rotating in the opposite direction, said member operable to make a connection in either direction of travel to couple the brake operating connection through said control member with the power driven shaft to receive a power impulse therefrom.

4. Brake operating mechanism, including a servo device, for a motor vehicle having a power driven shaft comprising in combination; a brake operating connection, a control member therefor, a clutch coupled with the shaft to be driven thereby, control means for the clutch, a rotatable member coupled with the clutch to be driven thereby irrespective of the direction of rotation of the clutch and connected with the control member to actuate the same to transmit power from the shaft to the brake operating connection.

5. Brake operating mechanism, including a servo device, for a motor vehicle having a power driven shaft comprising in combination; a brake operating connection, a control member therefor, a part coupled with the shaft to be actuated transversely thereof in opposite directions depending upon the direction of travel of the shaft, said part adapted to make a connection at one end when moving in one direction and at the other end when moving in the other direction to couple the brake operating connection with the power shaft to be actuated thereby.

6. Brake operating mechanism, including a servo device, for a motor vehicle having a power driven shaft comprising in combination; a brake operating connection, a control member therefor, a brake operating shaft arranged transversely of the power shaft and coupled through the control member with the brake operating connection, mechanism operable to couple the power shaft with the brake shaft to apply a torque thereto to actuate the brake operating connection in the same direction irrespective of the direction of rotation of the power shaft.

7. Vehicle brake mechanism comprising, in combination with a motor vehicle having a power driven shaft, a rotatable brake shaft extending transversely of the power shaft, a brake connection coupled with the brake shaft to be operatively actuated thereby, mechanism operable to couple the power shaft with the brake shaft to rotate the brake shaft including a part rotatably supported upon the brake shaft and driven by the power shaft endwise over the brake shaft in opposite directions depending upon the direction of rotation of the power shaft, and means on said brake shaft at opposite ends of said part to couple the part with the brake shaft to rotate the brake shaft to operatively actuate the brake operating connection.

8. Brake operating mechanism for a vehicle having a power driven shaft comprising a brake shaft extending transversely of the power shaft, a brake operating connection, a control member mechanically coupled with the brake connection to operatively actuate the same, a servo device to rotate the brake shaft, and linkage mechanically connecting the brake shaft with the brake operating connection through said control member whereby upon rotation of the brake shaft by the servo the control member is moved operatively to actuate the brake operating connection.

9. Brake operating mechanism for a vehicle having a power driven shaft comprising a brake shaft extending transversely of the power shaft, a brake operating connection, a control member mechanically coupled with the brake connection to operatively actuate the same, a servo device to rotate the brake shaft, and means connecting the brake shaft with the control member to move the control member to actuate the brake operating connection in either direction of rotation of the brake shaft.

10. Brake operating mechanism for a vehicle having a power driven shaft comprising a brake shaft extending transversely of the power shaft, a brake pedal, a brake operating connection mechanically coupled with the pedal to be operatively actuated thereby, and servo means coupling the brake shaft with the power shaft for rotation in opposite directions depending upon the direction of rotation of the power shaft, and mechanical linkage connecting the brake shaft with the pedal to move the pedal to operatively actuate the brake operating connection upon rotation of the brake shaft in either direction.

11. Brake operating mechanism for a vehicle having a power driven shaft comprising a brake shaft extending transversely of the power shaft, a brake pedal, a brake operating connection mechanically coupled with the pedal to be operatively actuated thereby, means coupling the brake shaft with the power shaft for rotation thereby in opposite directions depending upon the direction of rotation of the power shaft, an arm on the brake shaft, a link connecting said arm with the pedal to move the pedal to operatively actuate the brake operating connection upon rotation of the brake shaft in either direction.

12. Brake operating mechanism for a vehicle having a power shaft comprising a brake shaft, a brake pedal, a brake operating connection mechanically coupled with the pedal to be operatively actuated thereby upon depression of the pedal, means operable to couple the brake shaft with the power shaft for rotation thereby in opposite directions depending upon the direction of rotation of the power shaft, an arm on the brake shaft, a link connecting the arm with the pedal to depress the pedal upon rotation of the brake shaft in either direction to operatively actuate the brake operating connection.

13. Brake operating mechanism for a vehicle having a power driven shaft including a rotatable brake shaft, means including a control member selectively operable to couple the brake shaft to the power shaft for rotation thereby in opposite directions depending upon the direction of rotation of the power shaft, a brake operating connection, means including an arm on the brake shaft and a link connected therewith coupling the brake operating connection with the brake shaft to be operatively actuated thereby, said arm and link arranged normally and in the idle position of the brake shaft in the same straight line whereby rotation of the brake shaft in either direction actuates the brake operating connection at all times in the same direction.

14. Brake operating mechanism for a vehicle having brakes, mechanical operating mechanism coupled therewith to apply the brakes including a manually operable control member, power means responsive to a determined movement of said control member coupled with the brakes to apply the brakes including a reversibly rotatable shaft rotatable during movement of the vehicle, and means responsive to rotation of the shaft adapted to be moved in one direction in the application of the brakes when the car is moving forwardly and to be moved in the opposite direction in the application of the brakes when the car is moving rearwardly.

15. Brake operating mechanism for a vehicle having brakes, mechanical operating mechanism coupled therewith to apply the brakes including a manually operable control member, power means responsive to a determined movement of said control member coupled with the brakes to apply the brakes including a reversibly rotatable shaft rotatable during movement of the vehicle in one direction when the vehicle is moving forwardly and in the opposite direction when the vehicle is moving rearwardly and a member rotatably responsive to rotation of said shaft in either direction to apply the brakes and adapted to be moved axially in one direction to accomplish such application of the brakes when the vehicle is moving forwardly and to be moved axially in the other direction to accomplish such application of the brakes when the vehicle is moving rearwardly.

16. Brake operating mechanism for a vehicle having brakes, mechanical operating mechanism coupled therewith to apply the brakes including a manually operable control member, power means responsive to a determined movement of said control member coupled with the brakes to apply the brakes including a reversibly rotatable shaft rotatable during movement of the vehicle in one direction when the vehicle is moving forwardly and in the opposite direction when the vehicle is moving rearwardly, a pair of rotatable members arranged on opposite sides of said shaft and coupled with the brakes to exert brake applying effort thereon upon rotation of said members, and means responsive to the rotation of the shaft to be moved endwise thereby away from the shaft in either direction and depending upon the direction of rotation of the shaft to couple one rotatable member or the other with the shaft to be rotated thereby to exert brake applying effort on the brakes.

17. Brake operating mechanism for a vehicle having brakes and a reversibly rotatable shaft rotatable in one direction when the vehicle is moving forwardly and in the opposite direction when the vehicle is moving rearwardly, means operable to couple the shaft with the brakes to apply the brakes including a rotatable axially movable part coupled with the shaft to be operated thereby to apply the brakes and movable axially in one direction in applying the brakes when the vehicle is moving forwardly and movable axially in the opposite direction in applying the brakes when the vehicle is moving rearwardly.

18. Brake operating mechanism for a vehicle having brakes and a reversibly rotatable shaft rotatable in one direction when the vehicle is moving forwardly and in the opposite direction when the vehicle is moving rearwardly, means operable to couple the shaft with the brakes to apply the brakes including a rotatable axially movable part coupled with the shaft to be operated thereby to apply the brakes and movable automatically axially in one direction to make a connection to couple the shaft with the brakes to apply the brakes when the vehicle is moving forwardly and movable automatically axially in the opposite direction to make the connection to couple the shaft to the brakes to apply the brakes when the vehicle is moving rearwardly.

19. Brake operating mechanism for a vehicle having brakes, a brake pedal mechanically coupled therewith to apply the brakes, power means to exert brake applying effort on the brakes including a driven shaft reversibly rotatable upon reversal of direction of travel of the vehicle and rotatable means movable axially away from the shaft in either direction of rotation of the shaft to couple the shaft with the brakes to exert brake applying effort thereon through the rotation of said rotatable means.

20. Brake operating mechanism for a vehicle having brakes, a brake pedal mechanically coupled therewith to apply the brakes, power means to exert brake applying effort on the brakes including a driven shaft reversibly rotatable upon reversal of direction of travel of the vehicle and rotatable coupling means movable endwise away from the shaft along a line normal thereto upon rotation of the shaft in either direction to couple the shaft with the brakes to exert brake applying effort thereon through the rotation of said rotatable means.

21. In combination with a vehicle having brakes and a power rotated shaft, means for manually applying the brakes, clutch means for coupling said power driven shaft with said brakes to actuate the same, and means associated with the manual actuating means for selectively actuating said clutch.

22. In combination with a vehicle having brakes and a power rotated shaft, manually operable means for actuating said brakes, means for coupling said power driven shaft with said manually operable means, and means associated with said manually operable means for selectively controlling said coupling means.

23. In combination with a vehicle having brakes and a power rotated shaft, manually operable means for actuating said brakes, means for coupling said power driven shaft with said manually operable means, and mechanical means associated with said manually operable means for selectively controlling said coupling means.

24. In combination with a vehicle having brakes and a power rotated shaft, manually operable means for actuating said brakes, means for coupling said power driven shaft with said manually operable means, and electric means associated with said manually operable means for selectively controlling said coupling means.

In testimony whereof, I have hereunto signed my name.

HENRI PERROT.